No. 687,646. Patented Nov. 26, 1901.
D. NICKEL & J. G. BOYER.
AIR BRAKE FOR WAGONS.
(Application filed June 5, 1901.)
(No Model.)
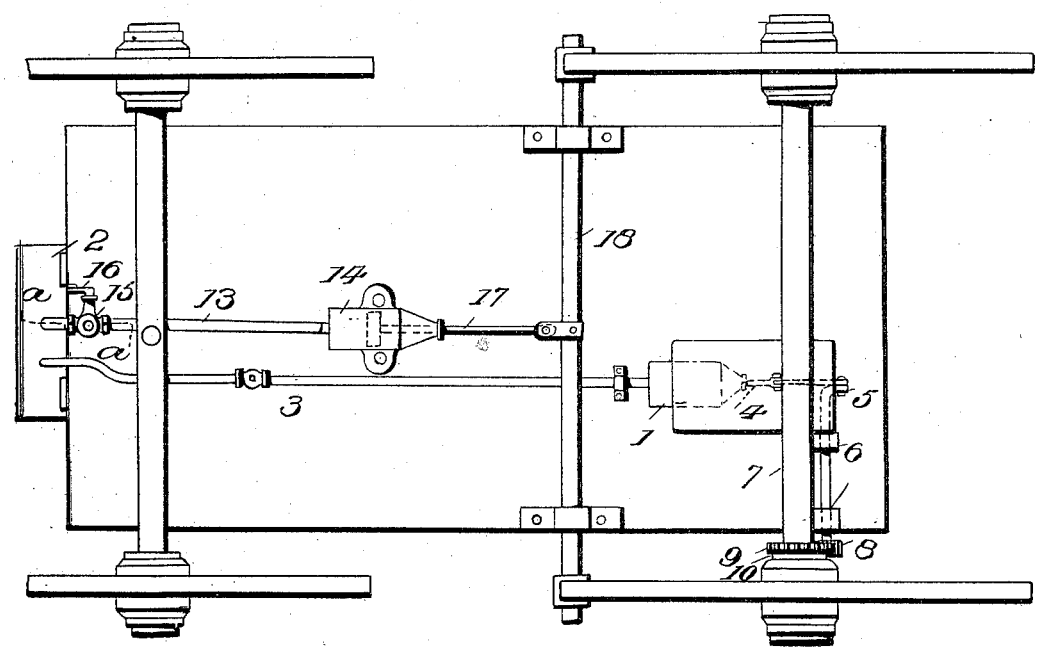
Witnesses
Inventors
David Nickel
Jacob G. Boyer
By James L. Pugh, Jr.
Attorney

UNITED STATES PATENT OFFICE.

DAVID NICKEL AND JACOB G. BOYER, OF SOUTH BETHLEHEM, PENNSYLVANIA.

AIR-BRAKE FOR WAGONS.

SPECIFICATION forming part of Letters Patent No. 687,646, dated November 26, 1901.

Application filed June 5, 1901. Serial No. 63,302. (No model.)

*To all whom it may concern:*

Be it known that we, DAVID NICKEL and JACOB G. BOYER, of South Bethlehem, in the county of Northampton and State of Pennsylvania, have invented certain new and useful Improvements in Air-Brakes for Wagons; and we do hereby declare the following to be a full, clear, and exact description of the invention, such as will enable others skilled in the art to which it appertains to make and use the same.

This invention relates to air-brakes, being specially designed for application to wagons and like vehicles.

The object is to provide an improved device by which wagon-brakes may be operated by compressed air through mechanism actuated by the driver, thus effecting a more positive action than is possible in the use of foot-levers or the brakes attached to the rear end of the running-gear, to operate which latter the driver has to leave his seat and remain behind the wagon.

The invention will be hereinafter fully set forth, and particularly pointed out in the claims.

In the accompanying drawings, Figure 1 is a bottom plan view of a wagon equipped with our improvement. Fig. 2 shows the means for operating the pump. Fig. 3 is a sectional view on line $a\ a$, Fig. 1, showing the storage-cylinder and its adjuncts.

Referring to the drawings, 1 designates a pump, and 2 a storage-cylinder, the two being connected by a pipe 3. The pump 1 has its piston-rod 4 connected by a link to the cranked end of a shaft 5, the latter being mounted in bearings 6 on the stationary axletree 7. On the outer end of the crank-shaft is a pinion 8, which meshes with a gear-wheel 9, whose collar 10 is secured on the hub of one of the rear carrying-wheels. The gear-pinion 8 is wider than the gear-wheel 9 to allow the latter sufficient play due to the lateral displacement of the wheel on its axle.

The storage-cylinder 2 is provided with an outlet-port 12, connected by a pipe 13 to the brake-cylinder 14.

15 designates a three-way valve or cock having a handle 16, by which the operator may regulate the passage of the air from the storage-cylinder to the brake-cylinder or permit it to escape into the atmosphere.

The brake-cylinder 14 has its piston-rod 17 connected to a brake-lever 18 and is preferably mounted in the central portion of the under side of the wagon, thus insuring an equal application of the brake-shoes against both wheels.

In operation the rotation of the carrying-wheels effects a continuous reciprocation of the pump-piston 4 through the media of the intermeshing gear pinion and wheel and the crank-shaft 5. The air thus compressed passes through pipe 3 to storage-cylinder 2, from whence, if the application of the brakes be not desired, it may be allowed to escape by adjustment of the valve 15. When the brakes are to be applied, it is only necessary to turn handle 16 so as to permit the air to pass from cylinder 2 through pipe 13 into brake-cylinder 14, where its action on the piston will through the brake-lever 18 effect a positive application of the brakes.

It will be noted that the crank-shaft is supported on the stationary axletree of the wagon. By this means the shaft is preserved from injury and is always maintained in the proper position to insure its pinion 8 meshing with gear-wheel 9. The attainment of these ends is more difficult in the class of vehicles employing rotating axles, since it is obvious that the crank-shaft cannot be positioned on the latter, but must be mounted on the vehicle-body and maintained in one position relatively to the axle. Whatever means is employed for effecting the rotation of the crank-shaft is liable to prove ineffectual, since any play in the axle will tend to injure such means or throw it out of engagement. By our invention the shaft and axletree are necessarily always in the same position relatively to the carrying-wheel, insuring a positive and effectual operation of the parts.

The means herein described are simple and inexpensive and may be readily applied to vehicles now in use.

We claim as our invention—

1. The combination with a wagon-body having a stationary axletree, carrying-wheels thereon, and a brake-beam, of a pneumatic apparatus under the control of the driver of the vehicle for applying and relieving pressure to and on such beam, a crank-shaft mounted on said axletree and connected to the piston-rod of the air-compressor, and means operated by one of said carrying-wheels for actuating said crank-shaft, substantially as set forth.

2. In an air-brake apparatus, the combination with a wagon-body having a stationary axletree, of a pneumatic apparatus for applying and releasing the brakes comprising an air-pump, a storage-cylinder and a brake-cylinder, pipes connecting said pump and cylinders, a shaft mounted on the stationary axletree having a crank on its inner end, a link connecting said shaft to the piston of said pump, a gear-pinion on the outer end of said shaft, and a gear-wheel on the adjacent carrying-wheel for actuating said crank-shaft, substantially as set forth.

In testimony whereof we have signed this specification in the presence of two subscribing witnesses.

DAVID NICKEL.
JACOB G. BOYER.

Witnesses:
WM. H. LOWREN,
ALLEN H. FOCHS.